United States Patent
Stabrey

(10) Patent No.: US 8,191,667 B2
(45) Date of Patent: Jun. 5, 2012

(54) METHOD FOR ADJUSTING A BRAKING SYSTEM IN A VEHICLE IN THE EVENT OF A COLLISION

(75) Inventor: Stephan Stabrey, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 285 days.

(21) Appl. No.: 12/599,142

(22) PCT Filed: May 23, 2008

(86) PCT No.: PCT/EP2008/056354
§ 371 (c)(1),
(2), (4) Date: Nov. 6, 2009

(87) PCT Pub. No.: WO2008/148651
PCT Pub. Date: Dec. 11, 2008

(65) Prior Publication Data
US 2010/0300794 A1   Dec. 2, 2010

(30) Foreign Application Priority Data
Jun. 4, 2007   (DE) .......................... 10 2007 025 960

(51) Int. Cl.
*B60K 28/14*   (2006.01)
*B60T 8/32*   (2006.01)
(52) U.S. Cl. ........................... 180/275; 180/274; 701/70
(58) Field of Classification Search ................... 180/275, 180/274; 701/70
See application file for complete search history.

(56) References Cited

U.S. PATENT DOCUMENTS

| 6,971,727 | B2 * | 12/2005 | Yoshizawa et al. | 303/193 |
| 7,418,345 | B2 * | 8/2008 | Diebold et al. | 701/301 |
| 7,425,043 | B2 * | 9/2008 | Doerr et al. | 303/193 |
| 7,975,798 | B2 * | 7/2011 | Lucas et al. | 180/275 |
| 2002/0112912 | A1 * | 8/2002 | Napier et al. | 180/275 |
| 2004/0112665 | A1 * | 6/2004 | Wielenga | 180/275 |
| 2007/0052530 | A1 * | 3/2007 | Diebold et al. | 340/467 |
| 2009/0038873 | A1 | 2/2009 | Lucas et al. | |
| 2009/0210114 | A1 * | 8/2009 | Baumann et al. | 701/45 |

FOREIGN PATENT DOCUMENTS

| DE | 197 53 971 | 6/1999 |
| DE | 100 04 088 | 8/2001 |
| DE | 101 08 879 | 9/2002 |
| DE | 102 31 558 | 1/2003 |
| DE | 10 2004 058663 | 6/2006 |
| DE | 10 2004 058814 | 6/2006 |
| EP | 1 659 006 | 5/2006 |
| JP | 9-240446 | 9/1997 |
| JP | 11-235969 | 8/1999 |
| JP | 2004-537464 | 12/2004 |
| JP | 2005-247046 | 9/2005 |
| WO | 2006/050741 | 5/2006 |
| WO | WO 2006061299 A1 * | 6/2006 |

* cited by examiner

*Primary Examiner* — Drew Brown
(74) *Attorney, Agent, or Firm* — Kenyon & Kenyon LLP

(57) ABSTRACT

In a method for adjusting a braking system in a vehicle, a collision of the vehicle is detected and a driver-independent brake intervention is performed. In a first step, after the collision a check is performed to see whether the wheel speed of a wheel is reduced, for example, through a jamming in the wheel housing, in which case in a second step at least one second wheel in the vehicle is decelerated in order to prevent a uncontrolled swerving of the vehicle.

13 Claims, 2 Drawing Sheets

METHOD FOR ADJUSTING A BRAKING SYSTEM IN A VEHICLE IN THE EVENT OF A COLLISION

FIELD OF THE INVENTION

The present invention relates to a method for adjusting a braking system in a vehicle.

BACKGROUND INFORMATION

German patent document DE 10 2004 058 814 A1 discusses a method for controlling the braking system of a motor vehicle, in which a driver-independent brake intervention is performed in the event of a collision. The intensity of the brake intervention may be a function of different influence variables, among others the current vehicle speed immediately after the impact and the severity of the collision. For example, if the vehicle can no longer be controlled by the driver after the collision, a full braking may be performed. On the other hand, if the collision is not as severe, the speed can be reduced to a threshold value, without bringing the vehicle to a standstill, in order to continue to give the driver the option of removing the vehicle from the accident region.

SUMMARY OF THE INVENTION

Starting from this related art, an objective of the exemplary embodiments and/or exemplary methods of the present invention is to keep the consequences of an accident as minor as possible after a vehicle collision. Advantageously, when a vehicle is damaged, a driver-independent braking is to be performed such that the negative effect of the damage on the stability is reduced.

According to the exemplary embodiments and/or exemplary methods of the present invention, this objective is attained by the features described herein, and other expedient refinements described herein.

The method according to the present invention for adjusting a braking system in a vehicle, in particular in a motor vehicle, initially determines whether an accident or a collision exists. If this is the case, a check is carried out to see whether the wheel speed of at least one wheel is reduced, by jamming in the wheel housing due to vehicle deformation, for example, whereupon a driver-independent braking intervention is performed and at least one additional wheel in the vehicle is decelerated. In this way, it is possible to influence the handling or the driving dynamics in a targeted manner, in particular to reduce the destabilization of the vehicle by the jammed wheel and thus to possibly prevent an uncontrolled swerving of the vehicle. In this context, either a reduction of the speed of the vehicle, or the stability may be given preference. The brake intervention is performed usefully in such a manner that initially the vehicle is stabilized and subsequently the vehicle speed is reduced.

The check to see whether an unacceptably high reduction of the wheel speed of the defective wheel exists is performed with the aid of a comparison with the speed reduction limit value. If the reduction of the wheel speed of one single wheel—or a plurality of wheels—exceeds this speed reduction limit value, or if the wheel is blocked, then the driver-independent brake intervention is performed. The speed reduction limit value is determined by comparing the wheel speeds of at least two, advantageously of all four wheels; to this end, an average value of the current wheel speeds may be formulated, the wheel speed reduction limit value being set as a defined deviation relative to the average value.

The reduction of the wheel speed via the driver-independent brake intervention may take place, for example, in such a way that the wheel speed of at least one additional wheel, in particular an intact wheel, is reduced to the wheel speed of the defective wheel. In this connection, to reduce the destabilizing effect of the blocked wheel, it may be useful to decelerate the opposite wheel on the same axis as the defective wheel, in order to reduce the destabilizing yawing moment or to offset it entirely. However, in principle, it is also possible to decelerate additionally or alternatively one or both wheels on the other axis.

Furthermore, a deceleration to a wheel speed other than the wheel speed of the defective wheel is possible.

In accordance with an additional exemplary embodiment, it is determined whether the defective wheel is blocked, that is, has a wheel speed equal to zero. In this case, it may be advantageous to block the opposite wheel of the same axis via the driver-independent braking intervention as well, which prevents undesired yawing moments. Moreover, the wheels of the respective other axis may also be decelerated, possibly decelerated until they are blocked, or also may remain unbraked, the braking leading to a faster standstill of the vehicle and the non-braking improving the vehicle stability.

In accordance with an additional advantageous embodiment, the collision direction and/or the collision severity are/is determined via the vehicle sensor system, in order to draw knowledge therefrom for the driver-independent brake intervention. Thus, for example, it is possible to differentiate between a front collision and a rear collision, as well as between lateral collisions or laterally offset front or rear collisions. For example, individual wheels on the front axis or the rear axis are decelerated as a function of the detected collision; apart from this, the location and the severity of the collision may also be used to plausibilize a detected wheel defect, in particular in order to rule out the possibility that the information about a wheel speed reduction or a blocking of the wheel originates from a defect of the wheel speed sensor. To this end, the vehicle deformation may be estimated from the crash severity and the impact location, on the basis of the information of an airbag system. Starting from a certain deformation, a jamming of a wheel is very probable. To plausibilize a wheel defect detected via a wheel speed sensor, the tire pressure, which is determined with the aid of a tire pressure sensor, may be utilized in addition to or as an alternative to the collision direction and collision severity, since a loss of tire pressure often goes along with damage to a tire.

As indicated above, the reaction to a front or rear collision is a differing deceleration of the wheels of the vehicle axes, for example, in that in the event of an offset front collision with damage to a front vehicle wheel, for example, only the non-defective, opposite front vehicle wheel is decelerated, whereas the rear vehicle wheels are not decelerated, or are decelerated only with reduced brake power, in order to maintain the vehicle stability. On the other hand, in the event of an offset rear collision with a blockage of a rear vehicle wheel, the vehicle is difficult or impossible to stabilize due to the markedly reduced lateral force on the rear axis, so that in this situation the opposite, non-defective rear wheel is also blocked in order to offset the yawing moment, and advantageously the front wheels are also decelerated considerably, possibly blocked, in order to bring the vehicle to a standstill as quickly as possible.

Furthermore, because in the event of an accident there is an increased probability that the brake line of the defective wheel is damaged, it may be useful to automatically close the brake-fluid intake valve of the damaged wheel after a collision is detected, so that the closing of the brake valve prevents a loss of brake fluid in the brake system. In this manner, a braking pressure that is high enough to decelerate one or a plurality of other wheels is ensured in the system.

The method according to the present invention may be performed by an ESP system (electronic stability program) in the vehicle, in which case it is also possible to use the sensor system of the ESP system, that is, in particular, the wheel speed sensors and possibly also the yaw rate sensor. The ESP control device, in which the method according to the present invention is stored, is usefully positioned, along with the independent ESP hydraulic unit, in the middle of the vehicle, under the central tunnel of the vehicle, for example, in order to prevent damage in the event of a front-side or rear-side collision of the vehicle.

Furthermore, it may be advantageous to use the sensor system of an airbag system for the method according to the present invention. Among other things, these include so-called upfront sensors (acceleration sensors in the front of the vehicle), with the help of which information about impact location and collision severity is able to be determined, and on the basis of which the vehicle deformation may also be estimated.

Further advantages and useful embodiments can be gathered from the further claims, the description of figures and the drawing.

DETAILED DESCRIPTION

Figure 1:
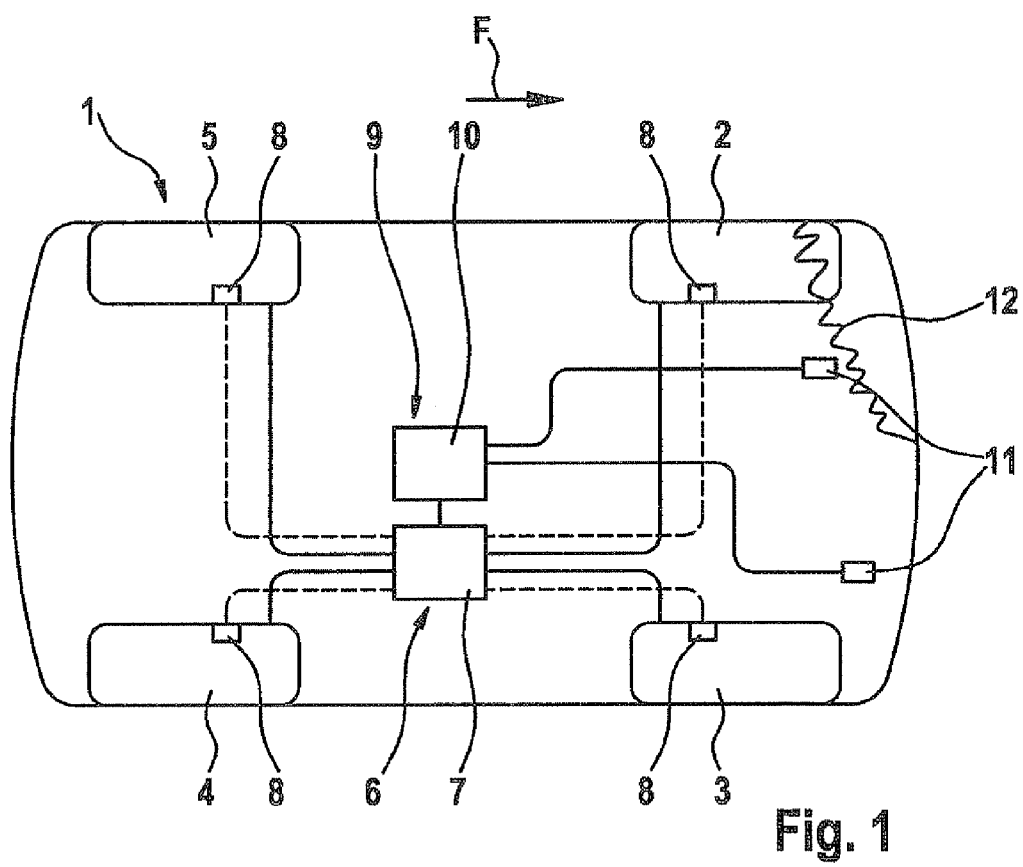
FIG. 1 shows a schematic illustration of a motor vehicle that is equipped with an ESP system and an airbag system including the associated sensor system.

In vehicle 1 shown in FIG. 1, F illustrates the forward direction of the vehicle. The front left, the front right, the rear right, and the rear left vehicle wheels are labeled with the reference numerals 2 through 5. Vehicle 1 is equipped with an ESP system 6 that includes an ESP control device 7, which is usefully positioned roughly in the middle of the vehicle, near the vehicle's gravitational center, in order to avoid becoming damaged in the event of a collision. Apart from this, a hydraulic unit is allocated to ESP system 6, and is advantageously disposed adjacent to control device 7. Furthermore, wheel speed sensors 8 at each vehicle wheel 2 through 5 form part of ESP system 6. Additionally, the ESP system may also include a yaw rate sensor.

Apart from this, an airbag system 9 is disposed in vehicle 1, which includes an airbag control device 10 and so-called upfront sensors 11, which are acceleration sensors disposed in the front vehicle section, via which both the collision direction and the collision severity of a vehicle collision may be determined. Additional sensors may also be provided in the rear section and possibly in the side section. As a rule, airbag control device 9 also is provided with built-in acceleration sensors, with which a collision may be detected. In FIG. 1, reference numeral 12 marks a crash line in the left front section, which represents the deformed outer body section after an offset front collision. This deformation of the body may be determined via upfront sensors 11.

Figure 2:
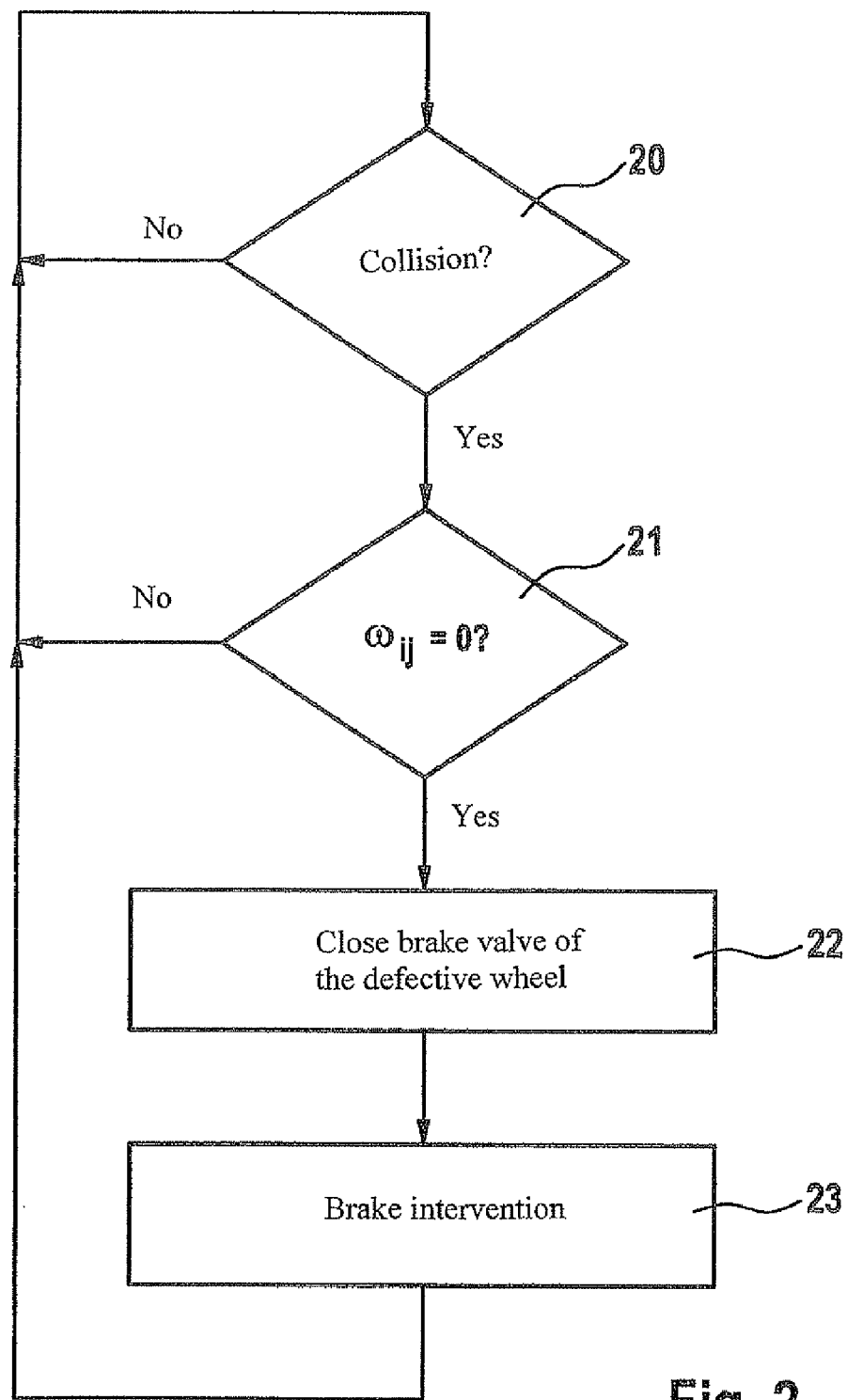
FIG. 2 shows an exemplary flow chart with the method steps for performing a driver-independent brake intervention in the event of a collision and a blocked wheel.

FIG. 2 illustrates the sequence of the method for adjusting the brake system in the vehicle in a roughly sketched manner, schematically. Initially, in method step 20, a check is carried out to see whether a collision exists. This is performed by evaluating the sensor signals of the airbag system. If the result of the query in method step 20 is that no collision exists, the no branch is followed back to the start of the method, and a new check is performed in cyclical intervals. A method start via interrupts is also possible.

However, if the evaluation of the sensor signals, which exist as acceleration values, in particular, indicate that a collision exists, then the yes branch is followed to next method step 21. By evaluating the sensor signals of the upfront sensors, the impact location and possibly also the collision severity may be determined as well. As a function of the impact location and the collision severity, it may be decided whether in the case of the existing collision it is to be assumed that the wheel housings were affected by the deformation. In some instances, sensors detecting an impact are disposed not only in the front section, but also in the side section and/or in the rear section of the vehicle.

If such a collision having a defined minimum severity exists, then in next method step 21, a check is carried out to see whether one of the vehicle wheels is blocked. To this end, the information of the wheel speed sensors is evaluated and a check is performed to see whether the wheel speeds are $\omega_{ij}$=0. This may be performed either systematically for all vehicle wheels or only for the wheel that is affected by the collision, which is able to be determined with the aid of the information determined previously in method step 20.

If the check in method step 21 indicates that none of the vehicle wheels is blocked, the no branch is followed back to the start of the method. On the other hand, in the event of a blockage of a vehicle wheel, the yes branch is followed to next method step 22, in which as a consequence or measure the brake valve of the defective wheel is closed initially, in order to prevent a loss of brake fluid in the brake system. This measure is based on the thought that in the event of an accident, an increased probability of a damaged brake line exists if a wheel or the wheel suspension is damaged so severely in an accident that the wheel is blocked.

After closing the brake valve of the defective wheel, next method step 23 is performed, according to which a driver-independent brake intervention is performed. The strength, duration, and the selection of the wheel to be decelerated are a function of different criteria. For example, if a front wheel is defective, the opposite wheel on the same axis is usefully decelerated in a driver-independent manner, in particular also blocked, in order to reduce or prevent a yawing moment produced by one-sided braking, and to automatically decelerate the vehicle.

It is useful to omit an ABS control in this context, in order to produce braking forces that are as uniform as possible at both front wheels. The rear wheels may either do without a driver-independent brake intervention in order to avoid a reduction of the lateral force and thus to promote the directional stability, or also, in accordance with an alternative embodiment, may be decelerated as well in order to bring the vehicle to a standstill as quickly as possible. In the event of a driver-independent brake intervention at the rear wheels, as a rule the wheels are not blocked, however, in order to maintain a minimum vehicle stability. Nevertheless, in this situation as well, it is possible to block the rear wheels through an automatic brake intervention.

If a rear wheel is affected by a defect, for example, in the case of an offset rear collision, then the vehicle is difficult or impossible to stabilize due to the significantly reduced lateral force of the rear axis. In this situation, the opposite rear wheel is also blocked in order to offset the yawing moment. Since in this instance the cornering force at the rear axis is additionally reduced, the vehicle must be brought to a standstill as quickly as possible, which is achieved via an independent blocking of the front wheels.

The method described in FIG. 2 relates to relatively severe collisions, in which at least one of the vehicle wheels is blocked due to the severity of the damage. In principle, however, the method is also applicable to less severe collisions, in which a wheel is not blocked, but the rotation of the wheel is restricted. In this case, the wheel speeds are checked for an unacceptably high reduction of the circumferential speed.

Furthermore, it may be useful to check additional plausibility conditions to rule out a defect of the wheel speed sensors. The plausibilization may be performed for one thing with the aid of the previously determined collision direction, in that a check is performed to see whether the reduced wheel speed or the blocked wheel is also at the position at which the deformation of the vehicle occurred, or with the aid of the check of the tire pressure of the defective wheel, as long as tire pressure sensors are provided in the vehicle, since damage to a wheel often goes along with a loss in tire pressure.

What is claimed is:

1. A method for adjusting a braking system in a vehicle, the method comprising:
   detecting a collision of the vehicle;
   performing, in the event of a collision, a driver-independent brake intervention;
   performing, after a collision, a check to determine one of (i) whether a wheel speed of a wheel is reduced to the extent that a reduction of the wheel speed exceeds a speed reduction limit value, and (ii) whether the wheel is blocked; and
   decelerating, in the event that the reduction of the wheel speed exceeds the speed reduction limit value or that the wheel is blocked, at least one additional wheel in the vehicle.

2. The method of claim 1, wherein an opposite wheel on the same axis is decelerated.

3. The method of claim 1, wherein the at least one additional wheel to be decelerated is decelerated to the same wheel speed as the wheel.

4. The method of claim 1, wherein the at least one additional wheel is decelerated, and in particular is blocked by a brake intervention, only if the wheel is blocked.

5. The method of claim 1, wherein in the event of a collision with damage to a rear wheel, all non-damaged wheels are decelerated and blocked.

6. The method of claim 1, wherein at least one of the collision direction and the impact location is determined using a vehicle sensor system.

7. The method of claim 6, wherein at least one of the determined impact location and the collision severity is utilized to plausibilize a detected wheel defect.

8. The method of claim 1, wherein a collision severity is determined using a vehicle sensor system, with the aid of accelerations occurring in the event of a collision.

9. The method of claim 1, wherein a tire pressure of the wheel is measured and utilized to plausibilize a detected wheel defect.

10. The method of claim 1, wherein after a collision is detected, a brake fluid intake valve of the wheel is closed to prevent a loss of brake fluid.

11. A regulation/control device for adjusting a braking system in a vehicle, comprising:
    a detecting arrangement to detect a collision of the vehicle;
    a driver-independent brake intervention arrangement to perform, in the event of a collision, a driver-independent brake intervention;
    a checking arrangement to perform, after a collision, a check to determine one of (i) whether a wheel speed of a wheel is reduced to the extent that a reduction of the wheel speed exceeds a speed reduction limit value, and (ii) whether the wheel is blocked; and
    a decelerating arrangement, in the event that the reduction of the wheel speed exceeds the speed reduction limit value or that the wheel is blocked, to decelerate at least one additional wheel in the vehicle.

12. The regulation/control device of claim 11, wherein the regulation/control device is the control device of a vehicle dynamics control.

13. The regulation/control device of claim 11, wherein the regulation/control device is positioned at least approximately in the center of the vehicle.

* * * * *